(12) United States Patent
Huang et al.

(10) Patent No.: US 7,896,501 B2
(45) Date of Patent: Mar. 1, 2011

(54) PROJECTOR AND OPTICAL ENGINE THEREOF

(75) Inventors: Wen-Ruei Huang, Hsin-Chu (TW); Tsung-Ching Lin, Hsin-Chu (TW)

(73) Assignee: Coretronic Corporation, Hsinchu (TW)

( * ) Notice: Subject to any disclaimer, the term of this patent is extended or adjusted under 35 U.S.C. 154(b) by 237 days.

(21) Appl. No.: 12/318,790

(22) Filed: Jan. 8, 2009

(65) Prior Publication Data
US 2009/0213339 A1    Aug. 27, 2009

(30) Foreign Application Priority Data
Feb. 22, 2008    (TW) ................................ 97106166 A

(51) Int. Cl.
*G03B 21/16* (2006.01)
(52) U.S. Cl. .............. 353/52; 353/56; 359/820; 348/748
(58) Field of Classification Search ................... 353/52, 353/55, 56, 60; 359/820; 348/748, 771
See application file for complete search history.

(56) References Cited

U.S. PATENT DOCUMENTS

| 7,149,041 B2 | 12/2006 | Hsu et al. |
| 7,494,230 B2 * | 2/2009 | May ............................... 353/122 |
| 7,637,632 B2 * | 12/2009 | Wang et al. ................... 362/294 |

FOREIGN PATENT DOCUMENTS

| TW | I281091 | 11/2005 |
| TW | I294986 | 4/2006 |

* cited by examiner

*Primary Examiner* — Kevin Pyo
(74) *Attorney, Agent, or Firm* — Bacon & Thomas, PLLC

(57) ABSTRACT

An optical engine includes a light source system for providing an incident light beam, a reflective light valve, a first case, a projection lens and a second case. The reflective light valve is disposed in the first case for receiving the incident light beam, reflecting and outputting an image light beam or a dumped light beam. The first case provides a first opening located in the light path of the dumped light beam. The projection lens is connected to the first case for receiving and projecting the image light beam to form an image. The second case intercommunicates with the first case via the first opening. The dumped light beam enters the second case through the first opening, and is reflected twice or more inside the second case. Moreover, the inner wall of the second case applies to absorb the energy of the dumped light beam.

20 Claims, 6 Drawing Sheets

PROJECTOR AND OPTICAL ENGINE THEREOF

BACKGROUND OF THE INVENTION (1) Field of the Invention

The invention relates to an optical engine, especially to an optical engine with well reliability and high image contrast.

(2) Description of the Prior Art

Digital light processing (DLP) projector is the projection system developed by Texas Instruments Incorporated (TI), applying mirror reflection imaging principle and owning the advantages of full digital, high contrast and exquisite image. Meanwhile, the projector using this technology is capable of effectively reducing its volume and weight and achieving light, thin, short and small.

Usually, a DLP projector has an optical engine, which takes actions of light beam generation, processing and transmission inside and produces a lot of heat. If the optical engine often has high temperature inside, the reliability and the service life of the inner components may decrease greatly. Therefore, many optical engines adopt heat dissipation design.

Referring to FIG. 1 for the schematic view of a conventional optical engine with heat dissipation device, an optical engine 10 has at least a light source system 11, a housing 12, a digital micromirror device (DMD) 13, a projection lens 14 and a heat dissipation device 16.

The light source system 11 includes a light source, a color filter rotary disc, a focusing lens and etc. for providing an incident light beam 111.

The DMD 13 is disposed in the housing 12 and located in the light path of the incident light beam 111 for receiving the incident light beam 111 from the light source 11, modulating and reflecting the incident light beam 111 to generate an image light beam 112 (ON light) or a dumped light beam 113 (OFF light).

The DMD 13 has many tiny movable lenses for reflecting the incident light beam 111 out. The DMD 13 reflects the above mentioned image light beam 112 or the dumped light beam 113 by controlling deflection angle of each tiny movable lens via digital signal. Each movable lens reflects the image light beam 112 or the dumped light beam 113 with different predetermined angles, so the light paths of the image light beam 112 and the dumped light beam 113 is anticipated.

The projection lens 14 is connected with the housing 12 and located in the light path of the image light beam 112 for projecting the image beam 112 to an outer screen to form an image.

The housing 12 has an opening 15 located in the light path of the dumped light beam 113. The dimension of the opening 15 makes the dumped light beam 113 to reflect into the opening 15 totally. The heat dissipation device 16 is fixed on the housing 12 and covers the opening 15. Thus, the dumped light beam 113 is projected to the heat dissipation device 16, and the heat of the dumped light beam 113 is absorbed and dissipated by the heat dissipation device 16. Besides, a heat insulation device 17 is disposed between the heat dissipation device 16 and the housing 12 to insulate heat conduction between the heat dissipation device 16 and housing 12 to avoid the heat of the heat dissipation device 16 transmitting to the housing 12.

However, the optical engine 10 in FIG. 1 still has following problems.

1. Part of the dumped light beam 113 is reflected or scattered by the inner wall of the heat dissipation device 16 to the projection lens 14 or the inner wall of the housing 12. Meanwhile, the part of the dumped light beam 113, which is projected to the projection lens 14, affects the normal image and reduces the contrast; another part of dumped light beam 113, which is projected into the inner wall of the housing 12, raises the temperature of the whole optical engine 10.

2. Due to the airtight state of the housing 12, when the dumped light beam 113 is absorbed by the heat dissipation device 16, the temperature of the heat dissipation device 16 is higher than that of the DMD 13 and the projection lens 14, which causes heat convection. At this time, the heat is circulated inside the housing 12 to heat up the DMD 13 and the projection lens 14. At the same time, the DMD 13 and the projection lens 14 are heated by radiation. Thus, part of the heat from the dumped light beam 113 accumulates in the housing 12 to make the DMD 13 and the projection lens 14 aged, which further affects the reliability and the service life of the optical engine 10.

There are two embodiments of the optical engine with the heat dissipation design in the Taiwan patent I281091, as shown in FIGS. 2A and 2B.

Referring to FIG. 2A, its embodiment is similar to FIG. 1. An optical engine 20 includes a light source system 21, a housing 22, a DMD 23, a projection lens 24, a first heat dissipation device 25 and a heat insulation device 26.

The light source system 21 provides an incident light beam 211 to the DMD 23. The DMD 23 receives the incident light beam 211 from the light source system 21, modulates and reflects the incident light beam 211 to form an image light beam 212 (ON light) or a dumped light beam 213 (OFF light). The image light beam 212 is transmitted to the projection lens 24 and projected to an outer screen to form an image, while the dumped light beam 213 is absorbed by the first heat dissipation device 25, which insulates the heat conduction with the housing 22 via the heat insulation device 26. Furthermore, the embodiment has a second heat dissipation device 27 disposed at the back of the DMD 23 to absorb the heat of the DMD 23.

Referring to the embodiment of the FIG. 2B, the dumped light beam 213 goes through a light transparent board 28 to project to a light shade device 29. The disadvantage of this design is that the surfaces of the light transparent board 28 and the light shade device 29 still reflect (scatter) part of the dumped light beam 213 back into the housing 22.

Due to the disadvantages in above mentioned conventional technology, it is necessary to raise an effective solution.

SUMMARY OF THE INVENTION

Accordingly, the object of the present invention is to change the light path of the dumped light beam by the design of the case in the optical engine to make the dumped light beam to reflect many times for attenuating the energy of the dumped light beam. Thereby, the temperature of the first case where the reflective light valve, the projection lens and other important components are located is capable of being lowered. Thus, the heat load of the reflective light valve and the projection lens is decreased, and the reliability and the service life of the components are increased.

The another object of the present invention is to change the light path of the dumped light beam by the design of the case in the optical engine to make the direction of reflecting the dumped light beam for the first time far away from the projection lens and generate many times reflection for attenuating the energy of the dumped light beam. By this way, the dumped light beam is not projected to the projection lens to affect the image projected by the projection lens. Thus, the contrast of the image is improved effectively.

An optical engine in the embodiment of the present invention includes a light source system, a reflective light valve, a first case, a projection lens and a second case.

The light source system provides an incident light beam. The reflective light valve is disposed in the first case and located in the light path of the incident light beam. The reflective light valve receives the incident light beam from the light source system and modulates the incident light beam for reflecting and outputting an image light beam or a dumped light beam.

The first case has the light paths of the incident light beam, the image light beam and the dumped light beam inside, and provides a first opening located in the light path of the dumped light beam.

The projection lens is connected to the first case and located in the light path of the image light beam for receiving the image light beam and projecting the image light beam to form an image.

The second case is connected to and intercommunicates with the first case via the first opening. The dumped light beam enters the second case through the first opening and reflects twice or more inside the second case. Moreover, the inner wall of the second case is suitable for absorbing the energy of the dumped light beam.

In the embodiment of the present invention, the direction of reflecting the dumped light beam for the first time in the second case is far away from the projection lens.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The present invention will now be specified with reference to its preferred embodiment illustrated in the drawings, in which.

DESCRIPTION OF THE PREFERRED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the FIG.(s) being described. The components of the present invention may be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component directly facing "B" component herein may contain the situations that "A" component faces "B" component directly or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
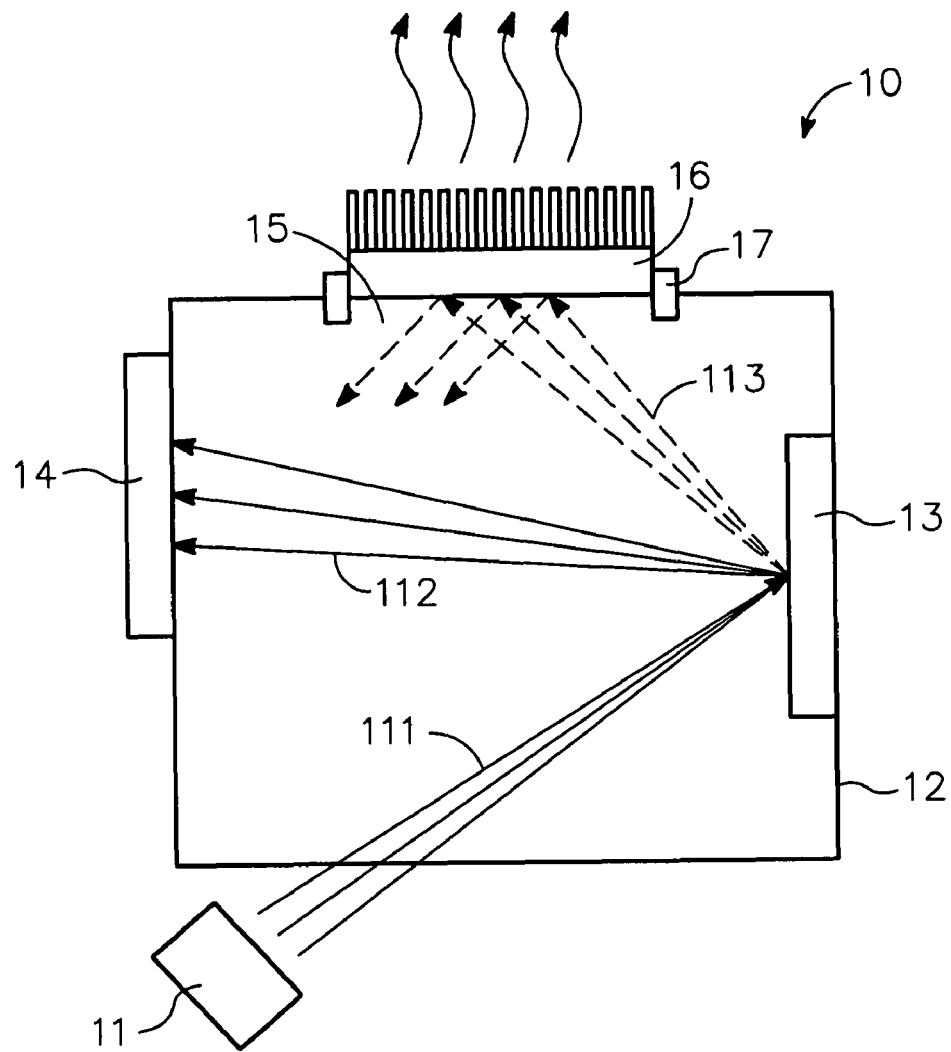
FIG. 1 is the schematic view of the conventional optical engine with the heat dissipation device.
Figure 2A:
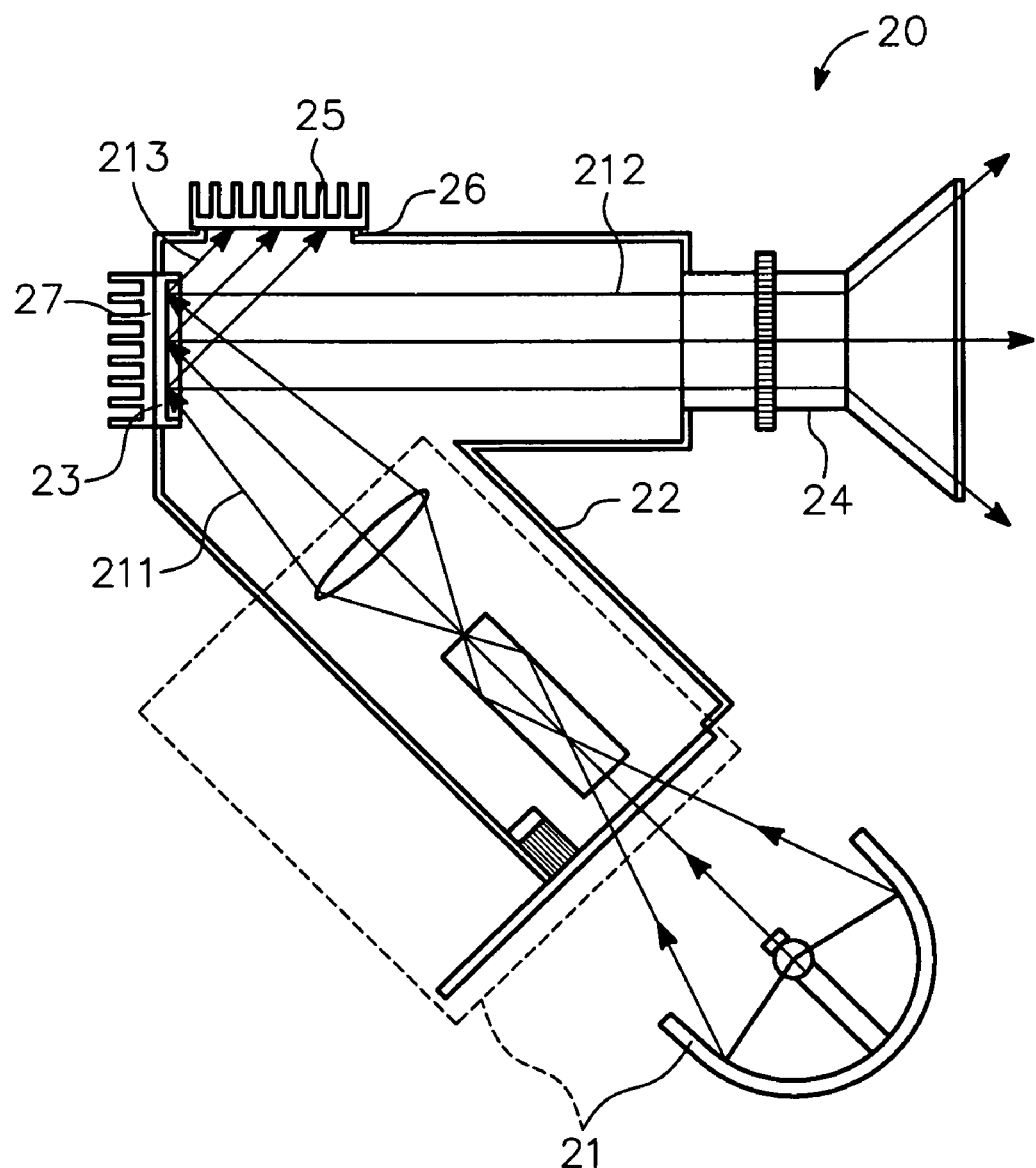
FIGS. 2A and 2B are two embodiments of the optical engine with the heat dissipation device in the Taiwan patent I281091.
Figure 2:
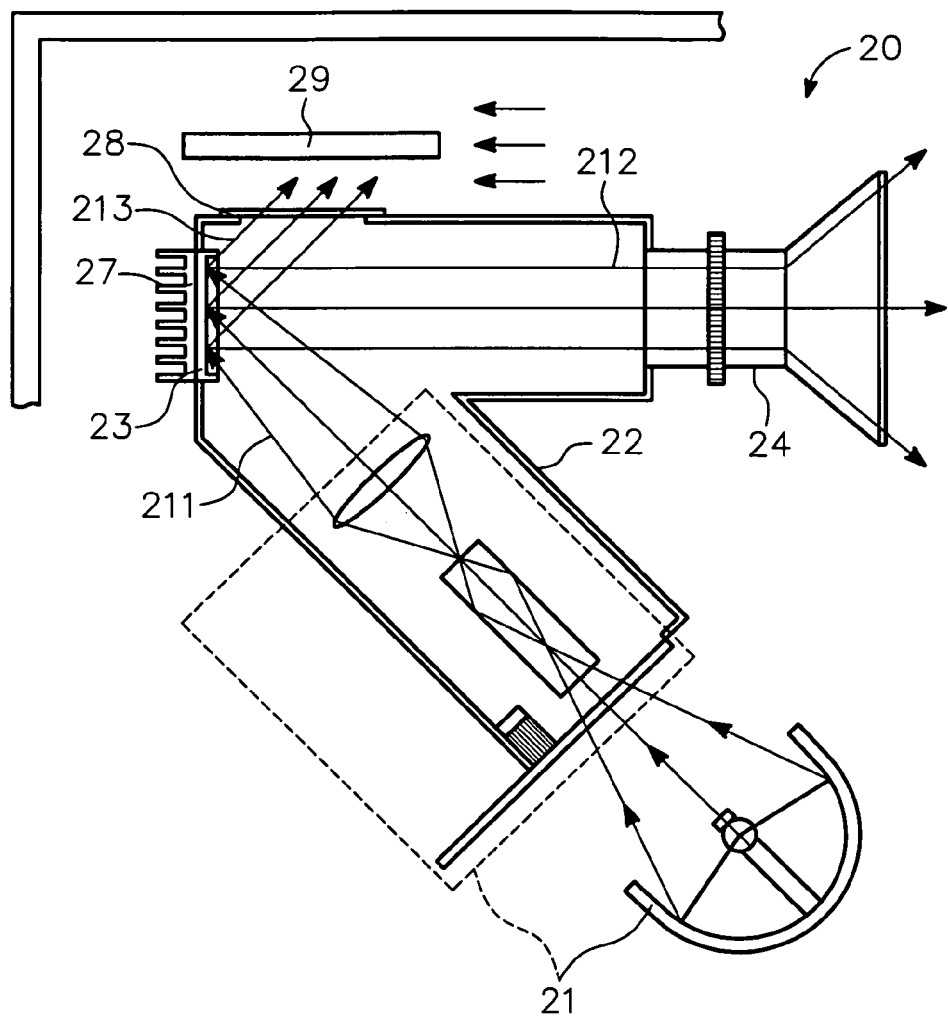
Figure 3:
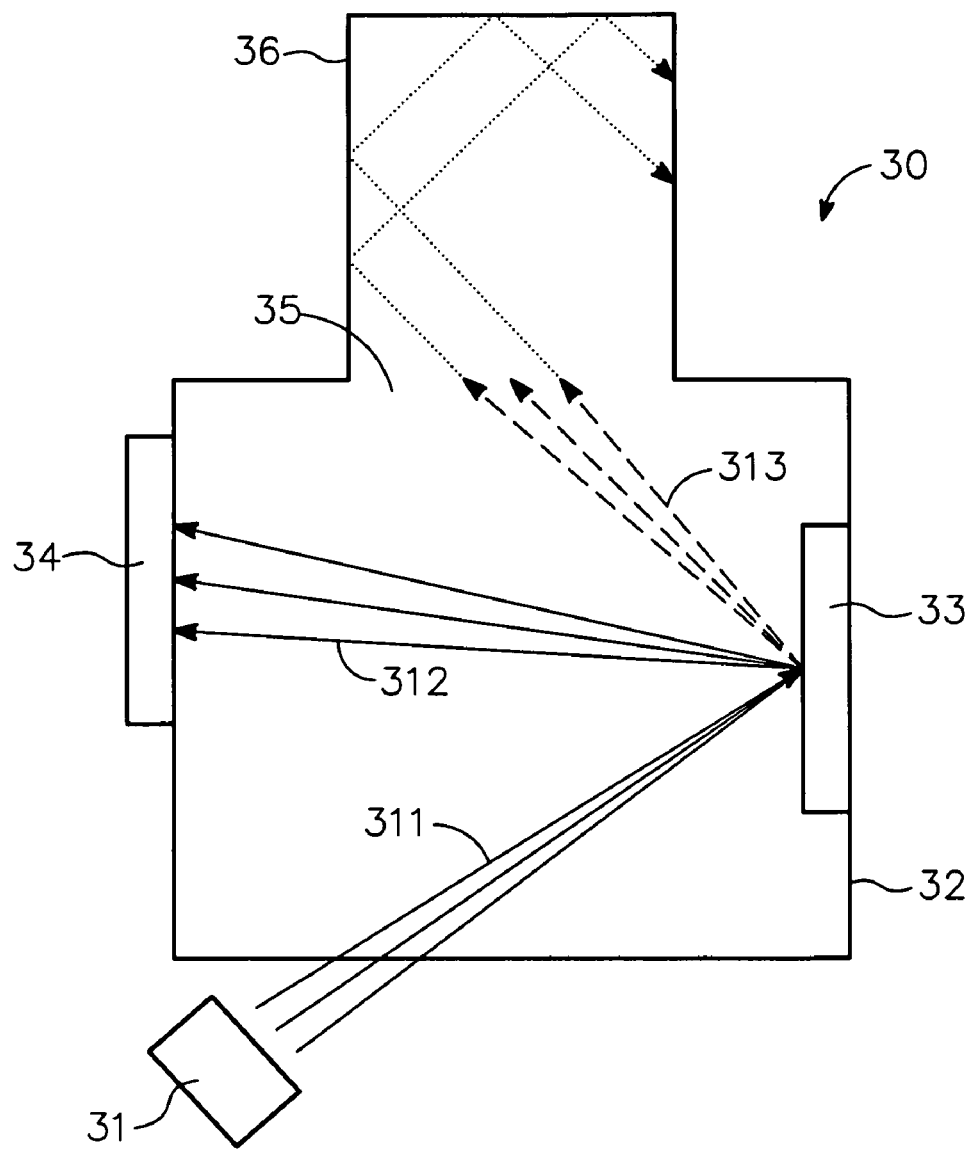
FIG. 3 is the first embodiment of the optical engine according to the present invention.

Referring to FIG. 3 for the first embodiment of the optical engine according to the present invention, an optical engine 30 has a light source system 31, a reflective light valve 33, a first case 32, a projection lens 34 and a second case 36.

The light source system 31 is composed of a light source device, a color filter rotary disc, a focusing lens and etc. to provide an incident light beam 311.

The reflective light valve 33 is disposed in the first case 32 and located in the light path of the incident light beam 311. The reflective light valve 33 receives the incident light beam 311 from the light source system 31 and modulates the incident light beam 311 for reflecting and outputting an image light beam 312 or a dumped light beam 313. In an embodiment, the reflective light valve 33 is a digital micromirror device (DMD) or a liquid crystal on silicon (LCOS) chip.

The light paths of the incident light beam 311, the image light beam 312 and the dumped light beam 313 are inside the first case 32. The first case 32 provides a first opening 35 located in the light path of the dumped light beam 313. The dimension of the first opening 35 is suitable to make the dumped light beam 313 to be projected into the first opening 35 totally.

The projection lens 34 is connected to the first case 32 and located in the light path of the image light beam 312 for receiving the image light beam 312 and projecting the image light beam 312 to form an image.

The second case 36 is connected to and intercommunicates with the first case 32 via the first opening 35. After the dumped light beam 313 is reflected by the reflective light valve 33 in the first case 32, the dumped light beam 313 enters the second case 36 through the first opening 35. The dumped light beam 313 is reflected twice or more after entering the second case 36. Noticeably, the direction of reflecting the dumped light beam 313 for the first time in the second case 36 is far away from the projection lens 34.

Moreover, the inner wall of the second case 36 is suitable for absorbing the energy of the dumped light beam 313. Thereby, the dumped light beam 313 attenuates and even disappears after being reflected several times in the second case 36. Thus, the second case 36 may effectively prevent the dumped light beam 313 from entering the projection lens 34. At the same time, the heat energy of the dumped light beam 313 is almost totally absorbed by the second case 36 without affecting the first case 32, where the reflective light valve 33, the projection lens 34 and other important components are located. Because of the ascending character of the hot airflow, the first opening 35 in an embodiment is disposed on top of the first case 32, namely on the ascending direction of the hot airflow in the first case 32.

In order to absorb the dumped light beam 313 effectively, the second case 36 has following different embodiments:

1. Form an light absorption layer or anti-reflection layer on the inner wall of the second case 36 by coating or plating;

2. The second case 36 itself is made of the light absorption material or anti-reflection material.

In addition, to avoid the heat conduction from the second case 36 to the first case 32, the second case 36 itself is made of the material with heat conductivity lower than that of the first case 32, such as plastic.

Figure 4:
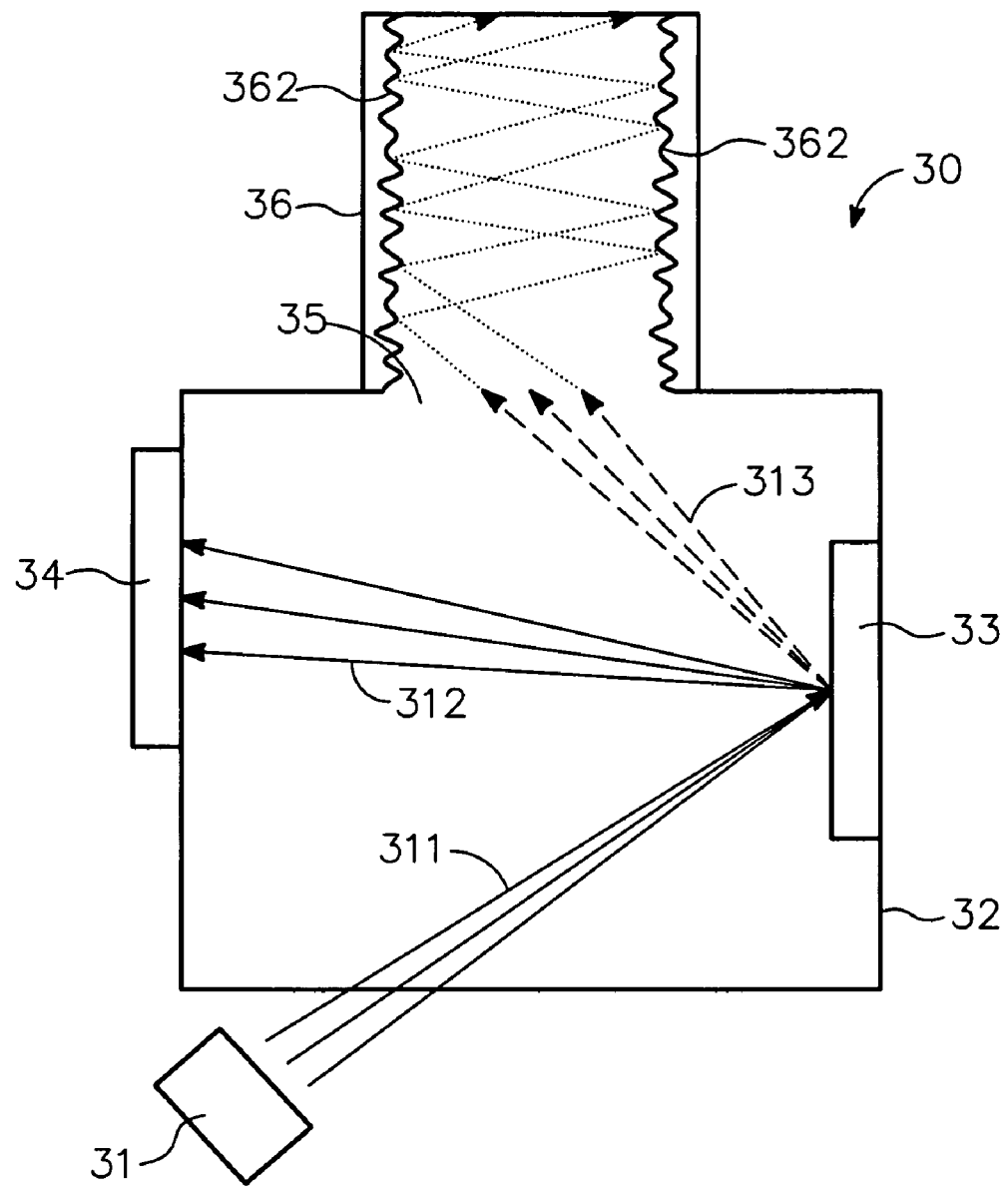
FIG. 4 is the second embodiment of the optical engine according to the present invention.

Referring to FIG. 4 for the second embodiment of the optical engine according to the present invention, the difference between the first and the second embodiments is that a surface scattering structure 362 is formed in the inner wall of the second case 36 in the second embodiment. The surface scattering structure 362 is capable of making the dumped light beam 313 to be reflected several times in the second case 36 as well as increasing the light absorption area to eliminate the dumped light beam 313 more effectively.

Figure 5:
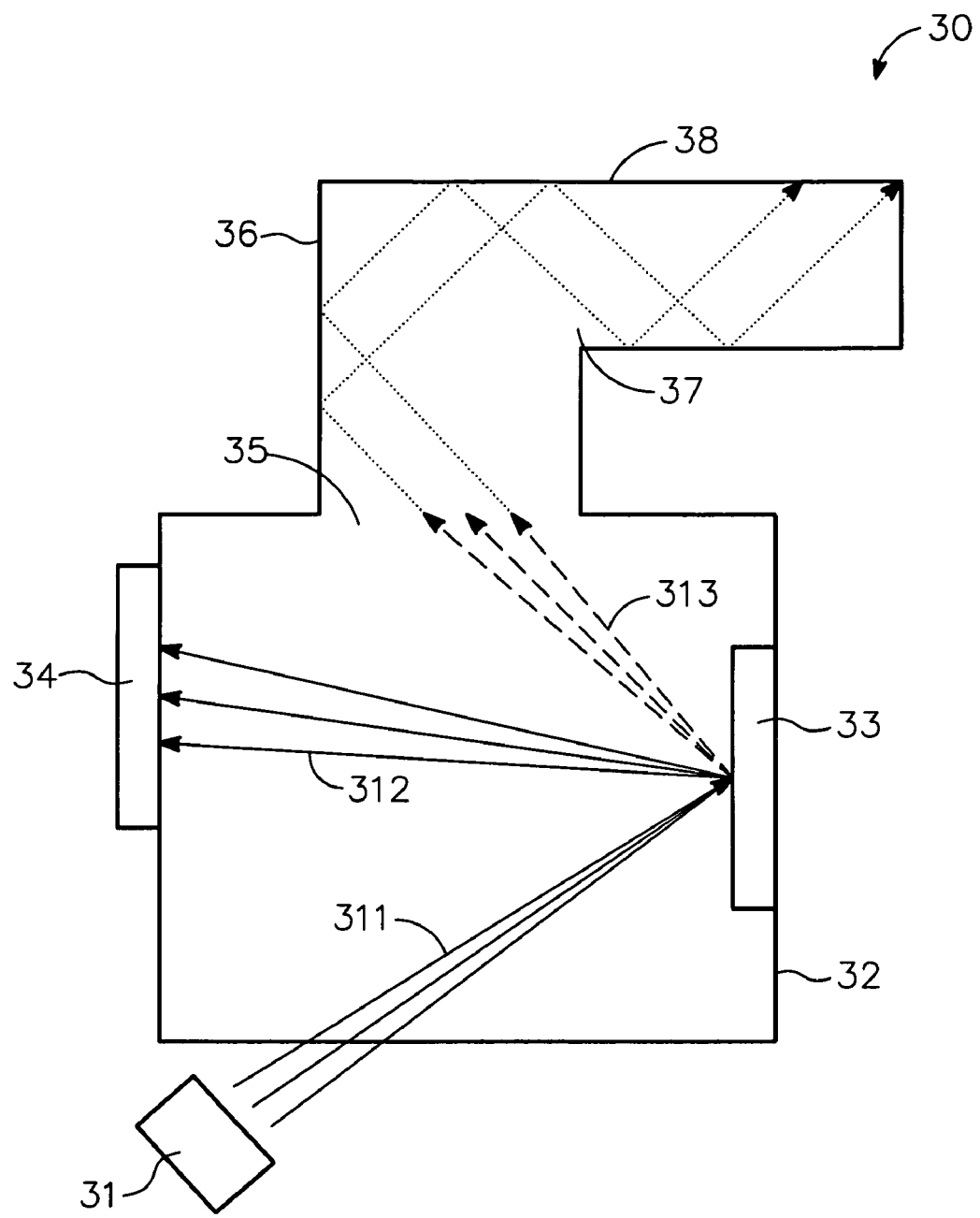
FIG. 5 is the third embodiment of the optical engine according to the present invention.

Referring to FIG. 5 for the third embodiment of the optical engine according to the present invention, the difference between the third embodiment and the first embodiment is that in the third embodiment, a second opening 37 is formed in the second case 36 and located in the light path of the dumped light beam 313. At the same time, the optical engine 30 in the third embodiment further has a third case 38, which is connected to and intercommunicates with the second case 36 via the second opening 37.

After being reflected in the inner wall of the second case 36, the dumped light beam 313 enters the third case 38 through the second opening 37 and is reflected several times in the third case 38. In the same way, the inner wall of the third case 38 is capable of absorbing the energy of the dumped light beam 313. Thus, the reflection times and light absorption area of the dumped light beam 313 is capable of being increased by setting the third case 38.

Noticeably, the optical engine 30 in the embodiment according to the present invention is usually disposed in a projector as the core of the projector. Moreover, it is shown in the experiment that the image contrast in the conventional technology is 2400 and the DMD temperature is 68.3° C. (environmental temperature is 25° C.). While using the optical engine 30 in the embodiment of this invention, the image contrast is 2600 and the DMD temperature is 63.3° C. (environmental temperature is 25° C.), obviously better than the conventional technology.

In conclusion, the optical engine in above mentioned embodiments has following advantages:

1. The design of the case in the optical engine is capable of effectively changing the light path of the dumped light beam to make the dumped light beam to be reflected many times for attenuating the energy of the dumped light beam. Thereby, the temperature of the first case where the reflective light valve, the projection lens and other important components are located is capable of being lowered. Thus, the heat load of the reflective light valve and the projection lens is decreased, and the reliability and service life of those components are increased.

2. The design of the case in the optical engine is capable of effectively changing the light path of the dumped light beam to make the direction of reflecting the dumped light beam for the first time far away from the projection lens and generate many times reflection for attenuating the energy of the dumped light beam. Thereby, the dumped light beam is not projected to the projection lens to affect the image projected by the projection lens. Thus, the contrast of the image is improved effectively.

3. The optical engine in the embodiment in the present invention is suitable to be applied to all projectors with DMD technology. Moreover, The optical engine is easily made without increasing cost and gets better effect than conventional technology.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like dose not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical engine, comprising:
a light source system, providing an incident light beam;
a reflective light valve, located in the light path of the incident light beam for receiving the incident light beam from the light source system, and modulating the incident light beam for reflecting and outputting an image light beam or a dumped light beam;
a first case, with the light paths of the incident light beam, the image light beam and the dumped light beam inside, providing a first opening located in the light path of the dumped light beam;
a projection lens, connected to the first case and located in the light path of the image light beam for receiving the image light beam and projecting the image light beam to form an image; and
a second case, connected to and intercommunicating with the first case via the first opening, wherein the dumped light beam enters the second case through the first opening and is reflected twice or more inside the second case, an inner wall of the second case applies to absorb the energy of the dumped light beam.

2. The optical engine according to claim 1, wherein the direction of reflecting the dumped light beam for the first time in the second case is far away from the projection lens.

3. The optical engine according to claim 1, wherein a light absorption layer or an anti-reflection layer is formed on the inner wall of the second case.

4. The optical engine according to claim 1, wherein the inner wall of the second case provides a surface scattering structure.

5. The optical engine according to claim 1, wherein the heat conductivity of the second case is lower than that of the first case.

6. The optical engine according to claim 5, wherein the second case is made of plastic.

7. The optical engine according to claim 1, wherein the first opening is disposed in the ascending direction of the hot airflow inside the first case and on the top of the first case.

8. The optical engine according to claim 1, wherein the second case provides a second opening located in the light path of the dumped light beam, the optical engine further comprises a third case connected to and intercommunicating with the second case via the second opening, the dumped light beam enters the third case through the second opening, an inner wall of the third case applies to absorb the energy of the dumped light beam.

9. The optical engine according to claim 1, wherein the reflective light valve is a digital micromirror device.

10. The optical engine according to claim 1, wherein the reflective light valve is a liquid crystal on silicon chip.

11. A projector with an optical engine, comprising:
  a light source system, providing an incident light beam;
  a reflective light valve, located in the light path of the incident light beam for receiving the incident light beam from the light source system, and modulating the incident light beam for reflecting and outputting an image light beam or a dumped light beam;
  a first case, with the light paths of the incident light beam, the image light beam and the dumped light beam inside, providing a first opening located in the light path of the dumped light beam;
  a projection lens, connected to the first case and located in the light path of the image light beam for receiving the image light beam and projecting the image light beam to form an image; and
  a second case, connected to and intercommunicating with the first case via the first opening, wherein the dumped light beam enters the second case through the first opening and is reflected twice or more inside the second case, an inner wall of the second case applies to absorb the energy of the dumped light beam.

12. The projector according to claim 11, wherein the direction of reflecting the dumped light beam for the first time in the second case is far away from the projection lens.

13. The projector according to claim 11, wherein a light absorption layer or an anti-reflection layer is formed on the inner wall of the second case.

14. The projector according to claim 11, wherein the inner wall of the second case provides a surface scattering structure.

15. The projector according to claim 11, wherein the heat conductivity of the second case is lower than that of the first case.

16. The projector according to claim 15, wherein the second case is made of plastic.

17. The projector according to claim 11, wherein the first opening is disposed in the ascending direction of the hot airflow inside the first case and on the top of the first case.

18. The projector according to claim 11, wherein the second case provides a second opening located in the light path of the dumped light beam, and the optical engine further comprises a third case connected to and intercommunicating with the second case via the second opening, and the dumped light beam enters the third case through the second opening, and inner wall of the third case applies to absorb the energy of the dumped light beam.

19. The projector according to claim 11, wherein the reflective light valve is a digital micromirror device.

20. The projector according to claim 11, wherein the reflective light valve is a liquid crystal on silicon chip.

* * * * *